United States Patent [19]

Steinecke et al.

[11] 4,440,252

[45] Apr. 3, 1984

[54] TRUCK CAB HYDRAULIC TILTING MECHANISM

[75] Inventors: Rudolf Steinecke, Weinstadt; Karl-Heinz Hensche, Leutenbach, both of Fed. Rep. of Germany

[73] Assignee: Daimler-Benz AG, Fed. Rep. of Germany

[21] Appl. No.: 322,209

[22] Filed: Nov. 17, 1981

[30] Foreign Application Priority Data

Nov. 19, 1980 [DE] Fed. Rep. of Germany ....... 3043590

[51] Int. Cl.$^3$ ............................................. B62D 27/00
[52] U.S. Cl. ..................... 180/89.15; 91/445
[58] Field of Search .......................... 180/89.14, 89.15; 91/445, 448

[56] References Cited

U.S. PATENT DOCUMENTS

| | | | |
|---|---|---|---|
| 2,825,306 | 3/1958 | Buri | 91/445 |
| 3,033,001 | 5/1962 | Russell et al. | 91/445 |
| 3,270,625 | 9/1966 | Huntington et al. | 91/448 |
| 3,792,747 | 2/1974 | Knutson | 180/89.15 |
| 3,801,151 | 4/1974 | Reynolds et al. | 180/89.15 |
| 3,945,299 | 3/1976 | Fritz et al. | 91/445 |

FOREIGN PATENT DOCUMENTS

506536   5/1976   U.S.S.R. ............ 180/89.15

*Primary Examiner*—Joseph F. Peters, Jr.
*Assistant Examiner*—Ross Weaver

*Attorney, Agent, or Firm*—Craig & Burns

[57] ABSTRACT

A hydraulic tilting mechanism for a driver's cab of a vehicle, with the mechanism including a double-acting working cylinder having accommodated therein a displaceable piston. Ducts or lines are provided for connecting the working cylinder with a supply tank or source of hydraulic fluid, with a pump being arranged in one of the ducts or lines and a joint control valve for controlling a movement of the piston being arranged in the ducts or lines. A closable duct by-passes the working cylinder and branches off from a three-way valve having two switch positions. The three-way valve is located in the duct or line leading to a first cylinder space which causes a tilting of the driver's cab. The three-way valve is adapted to be electromagnetically switched by way of a key. The closable duct or by-pass line discharges into a connecting duct or line arranged between the control valve and a second cylinder space which is adapted to cause a return of the driver's cab. A non-return or check valve is disposed between the three-way valve and the connecting duct into which the by-pass duct or line discharges. In one position of the three-way valve, the duct or line to the first cylinder space is opened and the by-pass duct or line is blocked and, in a second position, the duct or line to the first cylinder space is blocked and the by-pass duct or line is shut so that by means of the by-pass line or duct the hydraulic fluid is fed by the pump back to the storage tank.

11 Claims, 3 Drawing Figures

TRUCK CAB HYDRAULIC TILTING MECHANISM

The present invention relates to a hydraulic mechanism and, more particularly, to a hydraulic tilting mechanism for a driver's cab of a vehicle such as a truck with the mechanism including a double-acting working cylinder having a bottom end pivoted to a frame of the vehicle and a ram or piston rod pivoted at the driver's cab or vice versa. The working cylinder includes a first cylinder space for effecting a tilting of the cab and a second cylinder space for effecting a return of the driver's cab to a normal operating position. The first and second cylinder spaces are respectively connected by ducts with a hydraulic fluid supply reservoir or container, with a pump being arranged in one duct and a joint control valve controlling a movement of the piston rod being arranged in both ducts.

A manually operable tilting mechanism of the aforementioned type is proposed in, for example, in Offenlegungsschrift No. 2 260 173, with the tilting mechanism being arranged laterally at the frame of the vehicle so that it is easily accessible. A disadvantage of this proposed construction resides in the fact that the easy access to the tilting mechanism makes it possible for unauthorized personnel to tilt the driver's cab without any difficulties thereby enabling such personnel to remove components and/or gain access to the engine located on the vehicle frame under the driver's cab.

The aim underlying the present invention essentially resides in providing a hydraulic tilting mechanism for a driver's cab of a truck which may only be activated by authorized personnel.

In accordance with advantageous features of the present invention, a closable duct is provided that by-passes the working cylinder and branches off from a three-way valve with two switch positions, with the three-way valve being located in the duct of the first cylinder space and being electromagnetically switched by means of a key. The closable duct is adapted to discharge into the connecting duct between the control valve and the second cylinder space, with a non-return valve being connected therebetween. In one switch position of the three-way valve the duct to the first cylinder space is opened and the by-pass duct is blocked, and in the second switch position, the duct to the first cylinder space is blocked and the by-pass duct is switched shut so that, by means of the by-pass duct, the hydraulic fluid fed by the pump flows back to the hydraulic fluid storage or supply container.

By virtue of the above-noted features of the present invention, it is possible, in a simple manner with a key-operated electric switch, to override or place the tilting mechanism out of operation without a pump of the hydraulic mechanism having to be affected. An advantage of the utilization of a key-operated electric switch resides in the fact that, with a mechanical locking of the pump or a pump lever, such mechanical locking may be overcome by force and the pump nevertheless may be operated; however, with the subject matter of the present invention, even if the pump may still be operated and feed hydraulic fluid, by virtue of the provision of the by-pass duct, such feeding of the hydraulic fluid would have no effect on the working cylinder of the tilting mechanism.

In accordance with still further features of the present invention, with a hydraulic tilting mechanism for a truck with a safety mechanism which prevents unauthorized use, which mechanism is electromagnetically switched and arranged at the engine of the truck and, for example, interrupts the fuel supply, the three-way valve that closes the by-pass duct and the safety mechanism may be operated by a joint switch. Thus, through the single use of a key, not only is the tilting of the driver's cab prevented but also an operation of the engine can also reliably be prevented. Furthermore, since the safety mechanism is arranged at the engine, any access to such safety mechanism for the purposes of tampering or the like would require a tilting of the driver's cab; however, such access could not be gained and access to the safety mechanism is prevented so that the truck is better protected against theft.

Accordingly, it is an object of the present invention to provide a hydraulic tilting mechanism for a driver's cab of a vehicle such as a truck which avoids, by simple means, shortcomings and disadvantages encountered in the prior art.

Another object of the present invention resides in providing a hydraulic tilting mechanism for a driver's cab of a truck which prevents an unauthorized operation of the tilting mechanism.

Yet another object of the present invention resides in providing a hydraulic tilting mechanism for a driver's cab of a truck which, in cooperation with a safety mechanism, also prevents an unauthorized operation of the truck.

A further object of the present invention resides in providing a hydraulic tilting mechanism for a driver's cab of a truck which is simple in construction and therefore relatively inexpensive to manufacture.

These and other objects, features, and advantages of the present invention will become more apparent from the following description when taken in connection with the accompanying drawings which show, for the purposes of illustration only, two embodiments in accordance with the present invention, and wherein.

Figures 1, 2:
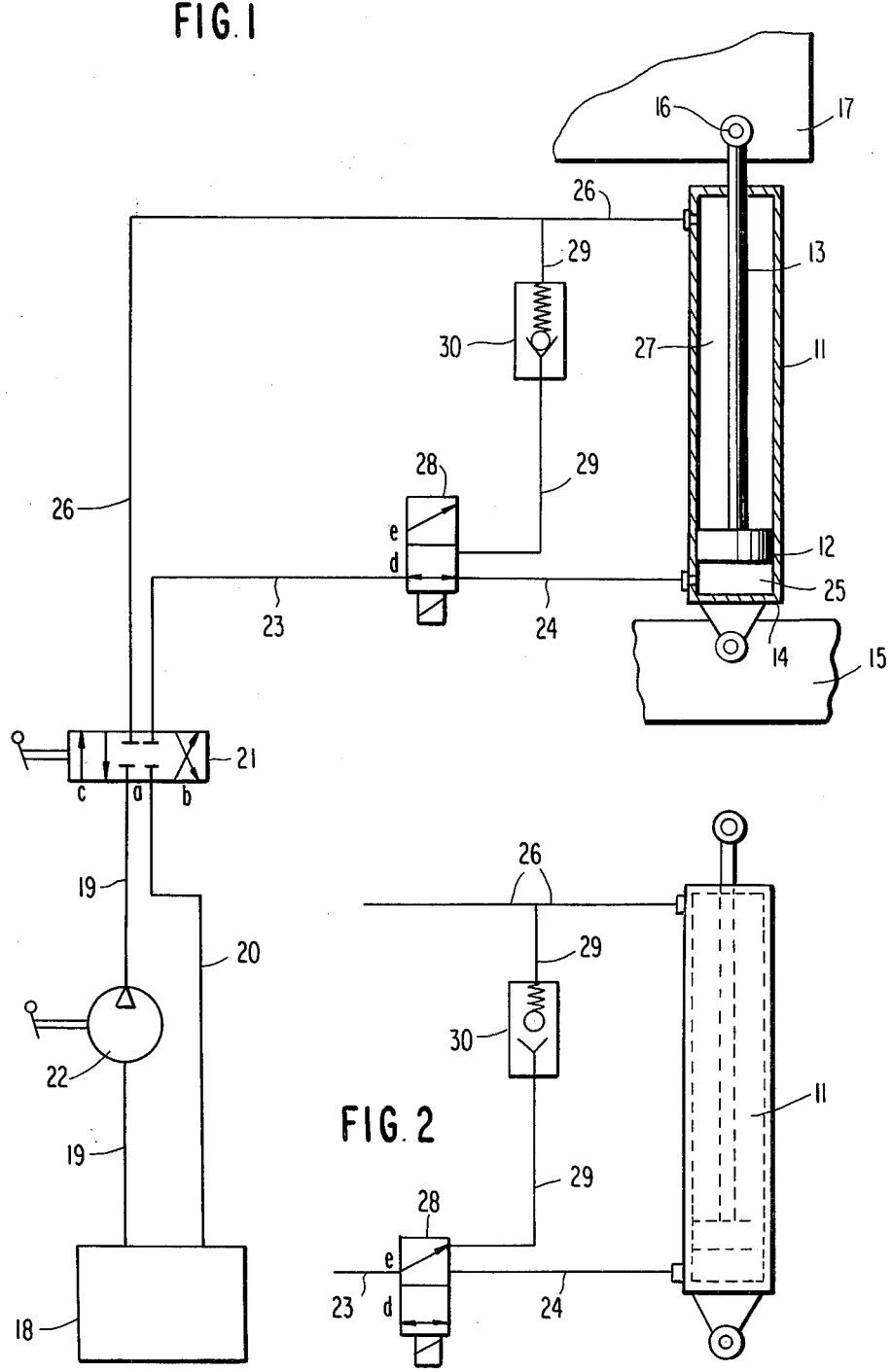
FIG. 1 is a schematic view of a simplified switch system for a hydraulic tilting mechanism constructed in accordance with the present invention for a driver's cab of a truck.
FIG. 2 is a partial detailed view of the switch system of FIG. 1 with a switch thereof in a different switch position.

Referring now to the drawings wherein like reference numerals are used in both views to designate like parts and, more particularly, to FIG. 1, a double-acting working cylinder 11 has disposed therein a piston or ram 12 having a piston rod 13, with the piston rod being longitudinally displaceable in the working cylinder 11. The working cylinder 11 and piston 12 are adapted to tilt a driver's cab of a vehicle as well as to return the cab to an original position. A bottom of the cylinder 14 is pivotably mounted to a frame member 15 of the truck, with an end 16 of the piston rod 13 being pivoted at a portion 17 of the driver's cab.

A storage tank or reservoir 18 is provided for accommodating hydraulic fluid, with the storage tank 18 being connected to a supply line 19 and a return duct 20. A hydraulic pump is located in the supply line 19, with the pump 22 being adapted to be operated manually. A four-way valve 21 is connected to the supply 19 and return duct 20. Further lines 23 and 24 extend from the four-way valve 21, with the lines 23, 24 leading to a first cylinder space 25 disposed at a position below the piston 12. A further line 26 extends from the four-way valve 21 and terminates in a second cylinder space 27 of the double-acting working cylinder 11, with the second cylinder space being located above the ram 12. The four-way valve 21 has three switch positions a, b and c, with the valve 21 being adapted to be manually switchable. In the illustrated switch position a, a connection between the supply line 19 and return duct 20 and the lines 23 and 26 is interrupted so no hydraulic fluid flows through the four-way valve 21 and the working cylinder 11 remains in its momentary position. In the switch position b, the flow line 19 and line 23 as well as the line 26 and return duct 20 are, in each case, connected with each other so that the hydraulic fluid fed by the pump 22 flows through the supply line 19, line 23 and 24 to the cylinder space 25 and thus acts on a bottom side of the piston 12. Under a pressure of the hydraulic fluid, the piston is lifted and the driver's cab is tilted by the piston rod 13. At the same time, hydraulic fluid is displaced from the cylinder space 27 which, through the line 26 and return duct 20 flows back to the storage tank 18.

In the switch position c, the return line 19 and line 26 as well as the line 23 and return duct 20 are, in each case, connected with each other. The hydraulic fluid fed by the pump 22 now flows through the supply line 19 and line 26 to the cylinder space 27 and, in the process, urges the piston 12 in a downward direction so that the driver's cab, by virtue of the connection with the piston rod 13, is once again returned to a normal original position. At the same time, the hydraulic fluid is displaced from the cylinder space 25 through the lines 24, 23, and return duct 20 so that the fluid flows back to the storage tank 18.

An electromagnetically switchable three-way valve 28 is located between the lines 23 and 24, with a further line 29 branching off from the valve 28. The line 29 is a by-pass line and by-passes the work cylinder 11. The line 29 discharges into a line 26 between the four-way valve 21 and the cylinder space 27. A check valve 30 is arranged in the line 29 and permits only flow in one direction, namely, from the three-way valve 28 to the line 26 and therefore relieves the three-way valve 28 with respect to pressure existing in the line 26.

The three-way valve 28 is provided with two switch positions d and e. In a normal switch position d, the lines 23 and 24 are connected with each other and permit a fluid flow from the four-way valve 21 to the cylinder space 25 as well as in a reverse direction. In the switch position d of the three-way valve 28, depending on the selected switch position of the four-way valve 21, a tilting and return of the driver's cab is possible in the manner described hereinabove.

If an unauthorized tilting of the driver's cab is to be prevented so as to make it impossible to gain access to an engine or other components of a truck under the cab, the three-way valve is switched from the position illustrated in FIG. 1 to the position illustrated in FIG. 2. For this purpose, a key-operated switch means (not shown), connected with an electrical source (not shown), is connected to the electromagnetic of the three-way valve 28, with the key-operated switch means being adapted to provide a triggering impulse to the electromagnetic when a key (not shown) actuates the switch means. Upon the electromagnet being actuated, the valve 28 is brought into the switch position e (FIG. 2), wherein the line 24 to the cylinder space 25 of the working cylinder is interrupted and a lifting of the piston 12 and thus a lifting of the driver's cab is not possible. The hydraulic fluid that is fed in the switch position (b) of the four-way valve 21 when the pump 22 is activated, into the three-way valve 28 is rerouted or by-passed into the line 29. From the line 29, while by-passing the working cylinder 11, the hydraulic fluid flows into the line 26 and further, through the four-way valve 21, into the return ducts 20 and back to the storage tank 18.

Figure 3:
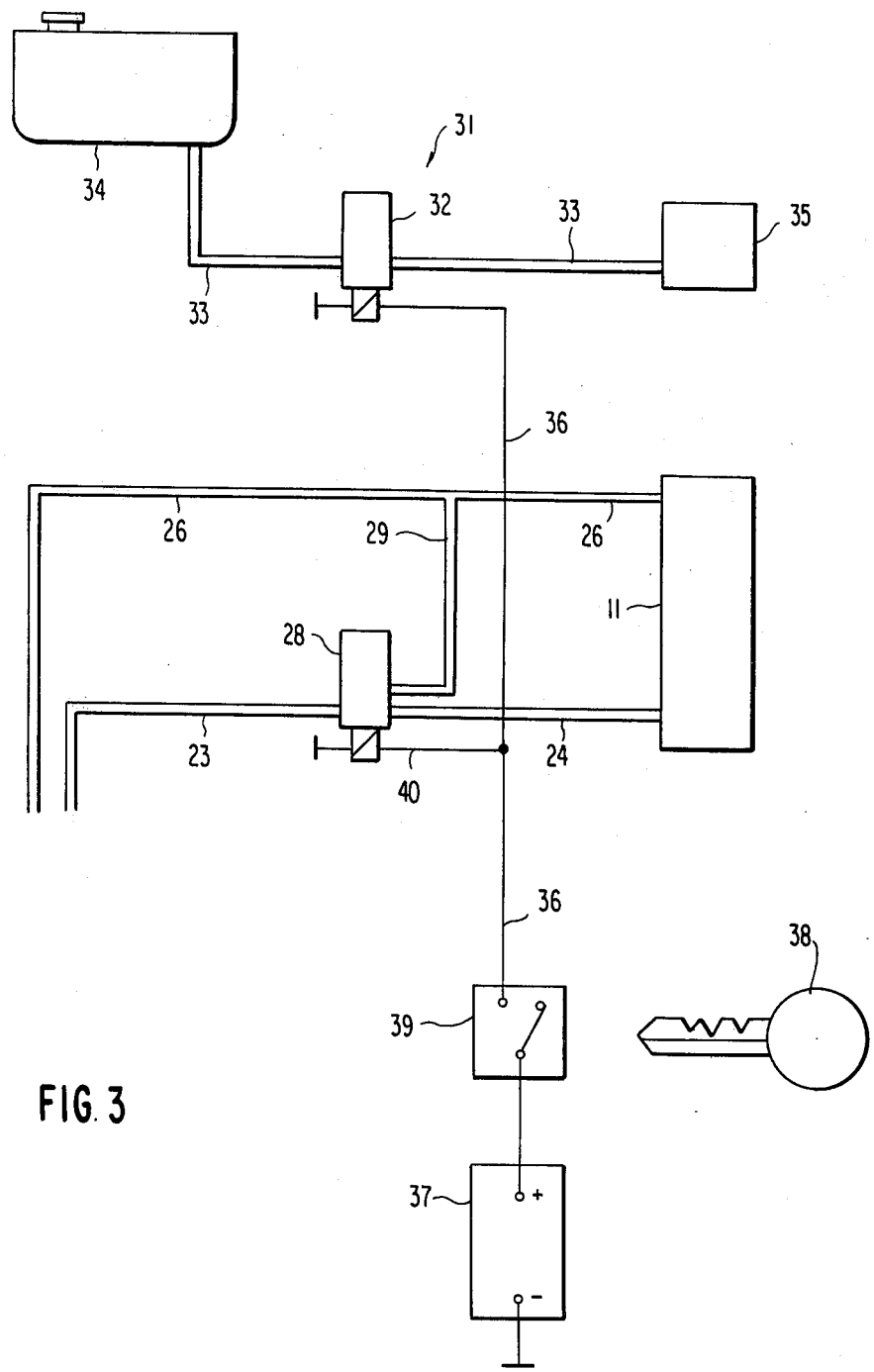
FIG. 3 is a schematic view of a further switch system for a hydraulic tilting mechanism constructed in accordance with the present invention.

In order to also prevent unauthorized operation of the truck, as shown in FIG. 3, a safety mechanism generally designated by the reference numeral 31 is provided for preventing unauthorized starting of the engine. The safety mechanism 31, may, for example, interrupt a fuel supply to the engine in a manner similar to, for example, Offenlegungsschrift No. 2, 300,258.

The safety mechanism 31 includes a solenoid valve 32 disposed in a fuel line 33 for controlling a supply of fuel from a fuel tank 34 to a fuel injection pump 35. The solenoid valve 32 is adapted to selectively block the fuel line 33 and, for this purpose, the solenoid valve 32 is connected to a power source 37 through an electrical circuit 36. The electrical circuit 36 includes a key operated switch 39 adapted to be closed with a key 38 inserted and opened when the key 38 is withdrawn or removed. The three-way valve 28, constructed as a solenoid valve, is connected to the power source 37 by a circuit means 40 branching off the circuit 36. The three-way valve 28 is operable to direct a flow of hydraulic fluid into the by-pass line 29 and the safety mechanism may be operated by the single key 38.

When the key 38 is inserted into the key operated switch 39, the circuit 36 is closed and the solenoid valve 39 opens the fuel line 33 so as to allow fuel to flow between the fuel tank 34 and the fuel injection pump 35 whereby the engine may be operated. At the same time, the three-way valve 28 is in the switch position d (FIG. 1) in which a tilting or lowering of the cab is possible.

When the key 38 is removed, as shown in FIG. 3, the circuit 36 is broken and the solenoid valve 39 closes or blocks the fuel line 33 so that no fuel can flow from the tank 34 to the injection pump 35 through the fuel line 33, thereby preventing the engine from operating. At the same time, the three-way valve 28 occupies the switch position e (FIG. 2) so that it is no longer possible to tilt the cab thereby denying access to the engine and/or other components under the cab. Thus, the construction of FIG. 3, provides a two-way assurance against an unauthorized starting of the engine of the truck.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A hydraulic tilting mechanism for a cab of a vehicle, the mechanism including double-acting working cylinder means arranged between the cab and frame of a vehicle, piston means displaceably mounted in the cylinder means, means for connecting the working cylinder means with a source of hydraulic fluid so as to enable displacement of the piston means in the working cylinder means by the hydraulic fluid, means for preventing unauthorized operation of the tilting mechanism including by-pass line means for by-passing the working cylinder means, valve means for selectively controlling a flow of the hydraulic fluid into the by-pass line means, manually operable switch means for controlling a positioning of the valve means for selectively controlling a flow of the hydraulic fluid into the by-pass line means, and check valve means for allowing unidirectional flow of the hydraulic fluid in the by-pass line means.

2. A hydraulic tilting mechanism according to claim 1, wherein the working cylinder means includes a first cylinder space means for causing a tilting of the cab and a second cylinder space means for causing a return of the cab from a tilted to a normal position, the means for connecting the working cylinder means with a source of hydraulic fluid includes a first hydraulic line means for connecting the first cylinder space means with the source of hydraulic fluid, and a second hydraulic line means for connecting the second cylinder space means with the source of hydraulic fluid, suitable valve means arranged in the first and second hydraulic line means for controlling a flow of hydraulic fluid to and from the source of hydraulic fluid so as to control a positioning of the piston means, the valve means for selectively controlling the flow of hydraulic fluid into the by-pass line means is a valve disposed in one of said first and second hydraulic line means.

3. A hydraulic tilting mechanism according to claim 2, wherein the by-pass line means branches off said valve and is connected with the other of said first and second hydraulic line means at a position between the switchable valve means and the working cylinder means.

4. A hydraulic tilting mechanism according to claim 3, wherein the valve is an electromagnetic three-way two position valve means having a first position for permitting a connection between the source of hydraulic fluid and the working cylinder means and a blocking of the by-pass means, and a second position blocking a flow of hydraulic fluid to the working cylinder means and opening the by-pass line means whereby hydraulic fluid may be fed back to the source of hydraulic fluid.

5. A hydraulic tilting mechanism according to claim 3, wherein said check valve means opens in a direction of the other of said first and second hydraulic line means.

6. A hydraulic tilting mechanism according to claims 1, 2, 3, 4, or 5, wherein the manually operable switch means is a key-operated switch.

7. A hydraulic tilting mechanism according to claim 6, wherein means are connected to an engine of the vehicle for preventing an unauthorized operation thereof, and means are provided for connecting the manually operable switch means with the unauthorized operation preventing means so as to enable the means for selectively controlling the flow of hydraulic fluid into the by-pass line means and the unauthorized operation preventing means to be operated by a joint key-operated switch.

8. A hydraulic tilting mechanism according to claim 7, wherein the piston means includes a piston rod having one end thereof pivotably connected to the cab of the vehicle, and a bottom portion of the working cylinder means is pivotably connected to the frame of the vehicle.

9. A hydraulic tilting mechanism according to claim 7, wherein the piston means includes a piston rod having one end thereof pivotably connected to the frame of the vehicle, and a portion of the working cylinder means pivotably connected to the cab of the vehicle.

10. A hydraulic tilting mechanism according to claim 7, wherein the unauthorized operation preventing means includes a means for interrupting a fuel supply to the engine.

11. A hydraulic tilting mechanism according to claim 10, wherein the switchable valve means is a four-way three-position valve.

* * * * *